Sept. 17, 1968  V. G. LUCAS  3,401,876
MIXING AND DECANTING CENTRIFUGE

Filed July 25, 1966  5 Sheets-Sheet 1

INVENTOR:
VICTOR GRIFFOLS LUCAS
BY
Dawson, Tilton, Fallon, Lungmus & Alexander
ATT'YS

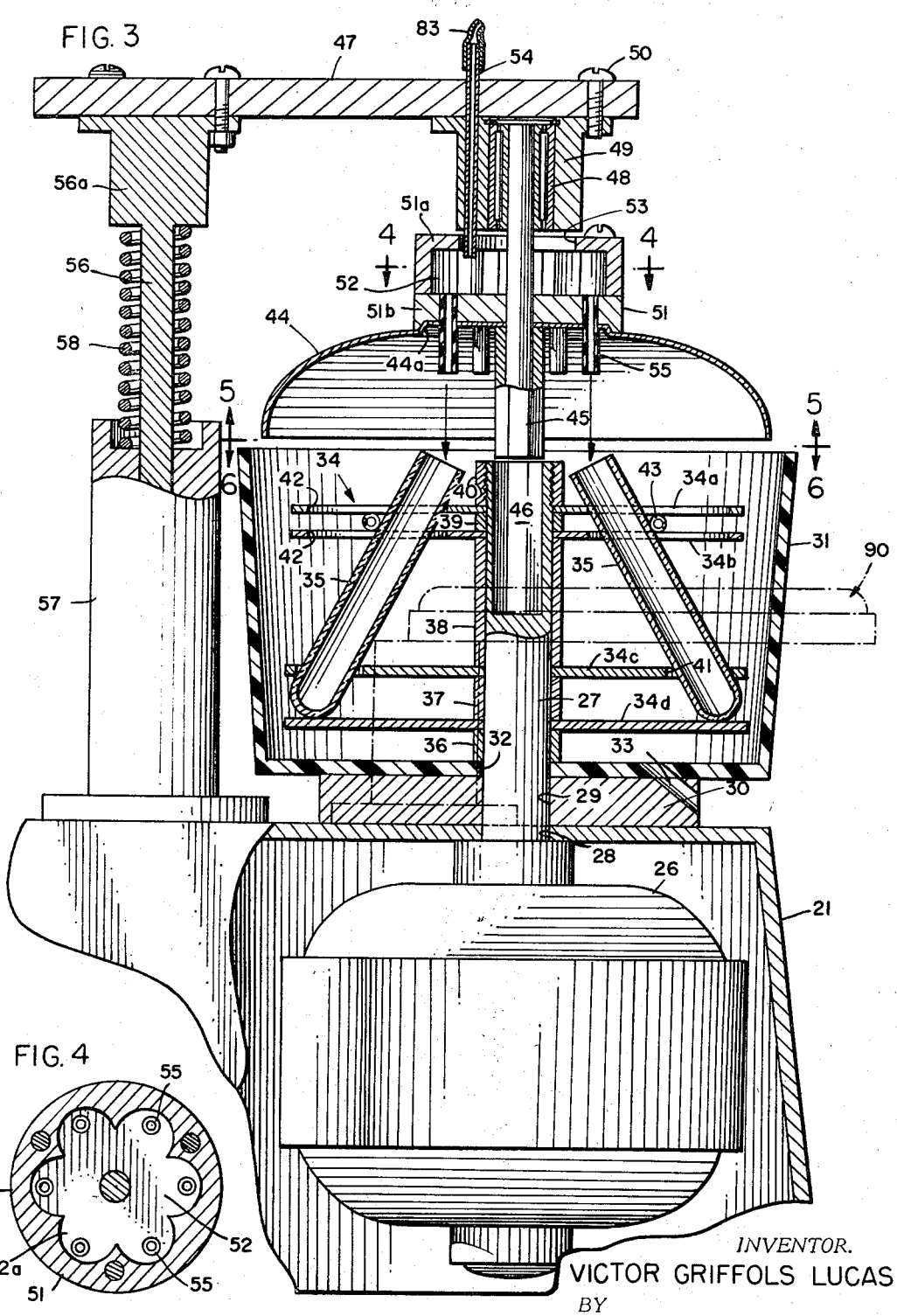

Sept. 17, 1968  V. G. LUCAS  3,401,876
MIXING AND DECANTING CENTRIFUGE
Filed July 25, 1966  5 Sheets-Sheet 3

INVENTOR:
VICTOR GRIFFOLS LUCAS
BY
Dawson, Tilton, Falloy, Lungmus & Alexander
ATT'YS Sept. 17, 1968  V. G. LUCAS  3,401,876
MIXING AND DECANTING CENTRIFUGE
Filed July 25, 1966  5 Sheets-Sheet 4

INVENTOR:
VICTOR GRIFFOLS LUCAS
BY
Dawson, Tilton, Fallon, Lungmus & Alexander
ATT'YS

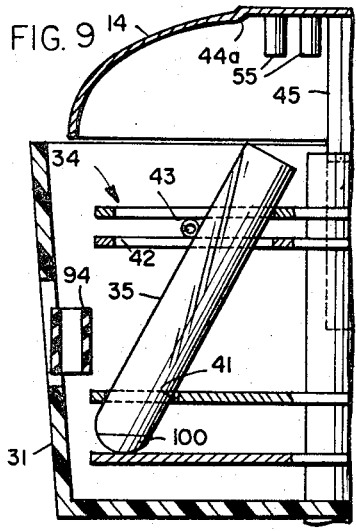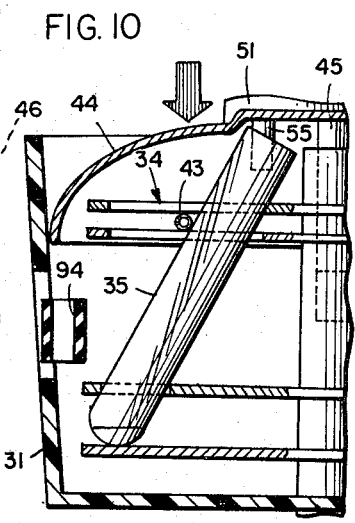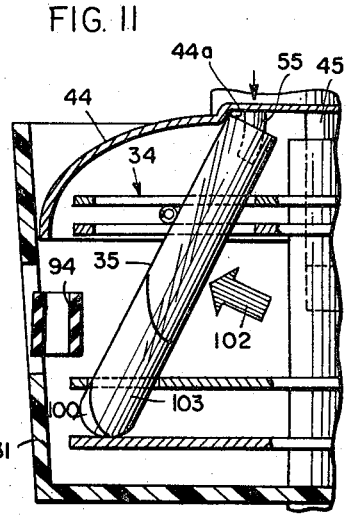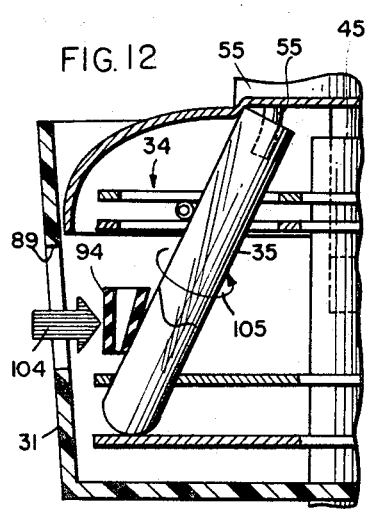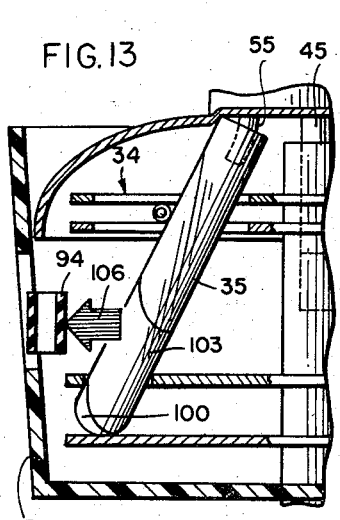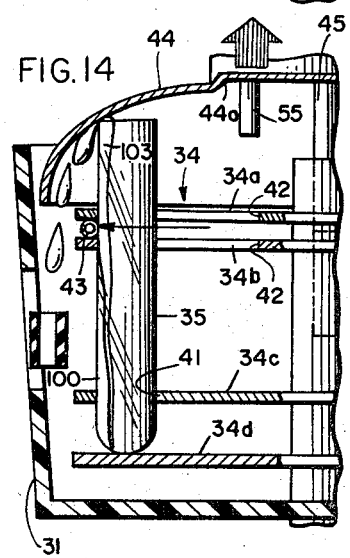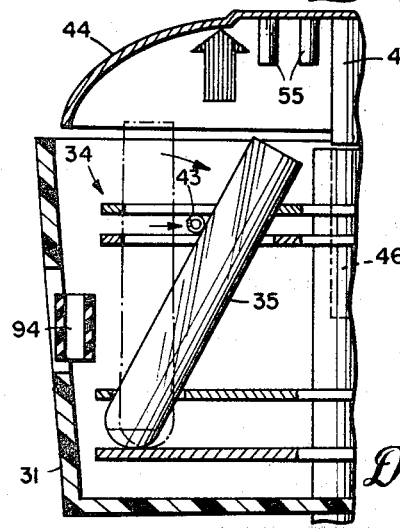

United States Patent Office 3,401,876
Patented Sept. 17, 1968

3,401,876
MIXING AND DECANTING CENTRIFUGE
Victor Grifols Lucas, Barcelona, Spain, assignor to Dade Reagents, Inc., Miami, Fla., a corporation of Florida
Filed July 25, 1966, Ser. No. 567,437
17 Claims. (Cl. 233—26)

ABSTRACT OF THE DISCLOSURE

A centrifuge, and method of centrifugation, wherein a plurality of open-topped sample tubes are carried by a holder for rotation about a central vertical axis. The tubes are supported adjacent their lower ends for outward and inward pivotal movement of the open upper ends thereof. Normally such tubes extend upwardly and inwardly towards the vertical axis of centrifugation and are held in such positions by a cover which engages the upper ends of the tubes. The cover is rotatable with the holder and is mounted for independent vertical movement with respect to the holder. When discharge of fluid from the sample tubes is to take place, as in a decanting step following mixing and centrifuging of the tubes' contents, the cover gradually rises to permit the pivotally supported tubes to swing outwardly into generally vertical positions under the influence of centrifugal force. Means are provided for automatically lifting the cover in timed relation with respect to other operational steps.

---

This invention relates to a centrifuge and, more specifically, to a centrifuge which is not only capable of separating materials of varying specific gravities, but also of performing mixing operations, or decanting operations, or both.

The present invention is particularly suitable for use in the laboratory although other applications requiring batch treatment might be found. In the clinical laboratory, a centrifuge embodying the invention may be effectively used in performing tests requiring a sequence of mixing, centrifuging, and decanting operations such as, for example, the Coombs' or antiglobulin test. In such a test, proper technique requires that a specimen of red blood cells be carefully washed in saline three times. After the third wash, the cells are treated with an antihuman globulin serum. Normal erythrocytes are not agglutinated by the serum and the occurrence of agglutination is an indication of incomplete antibody on the patient's red cells.

As in most clinical laboratory procedures, the effectiveness of the Coomb's test as a diagnostic aid depends to a large extent on the care with which the procedural steps are carried out. Since a number of such tests are often conducted simultaneously, cross contamination is an ever-present danger and, should it occur, is obviously likely to produce misleading test results. False indications may also arise from inexactness in the timing of the procedural steps or in the proportioning of the reagents.

Accordingly, it is an object of the present invention to provide a centrifuge which is adapted for use in mixing, washing, and decanting samples, all automatically, as well as the customary operation of centrifuging such samples. Another object is to provide an apparatus and method in which such washing, centrifuging, and decanting steps are recycled automatically and in which the sequence of steps occurs automatically and without interruption or inspection on the part of a technician.

Another object is to provide a centrifuge in which a plurality of containers are normally supported for the centrifugation of their contents, and may be mechanically and automatically reoriented for a subsequent decanting operation. A further object is to provide a centrifuge in which the washing, mixing, centrifuging and decanting steps all occur without interruption in the rotary operation of the unit.

A still further object is to provide an apparatus in which substantially equal amounts of liquid may be added to a plurality of sample-containing tubes while such tubes are being rotated or spun in a centrifuging action. A still further object is to provide such a unit in which the plurality of sample tubes not only revolve about a central axis of centrifugation, but also rotate about their own axes to achieve an intimate mixing of the solid and liquid parts of each sample.

Figure 1:
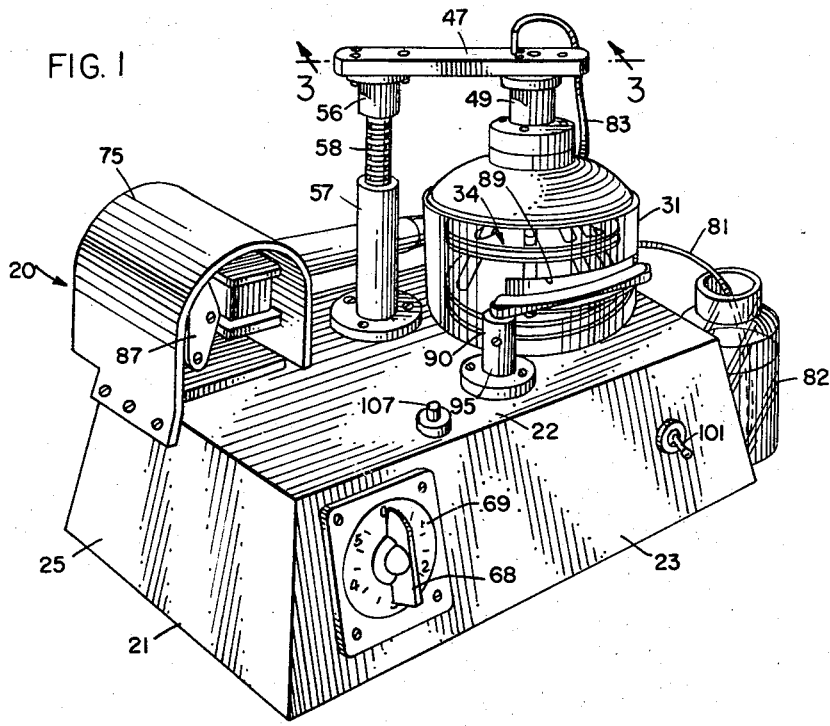
Figure 2:
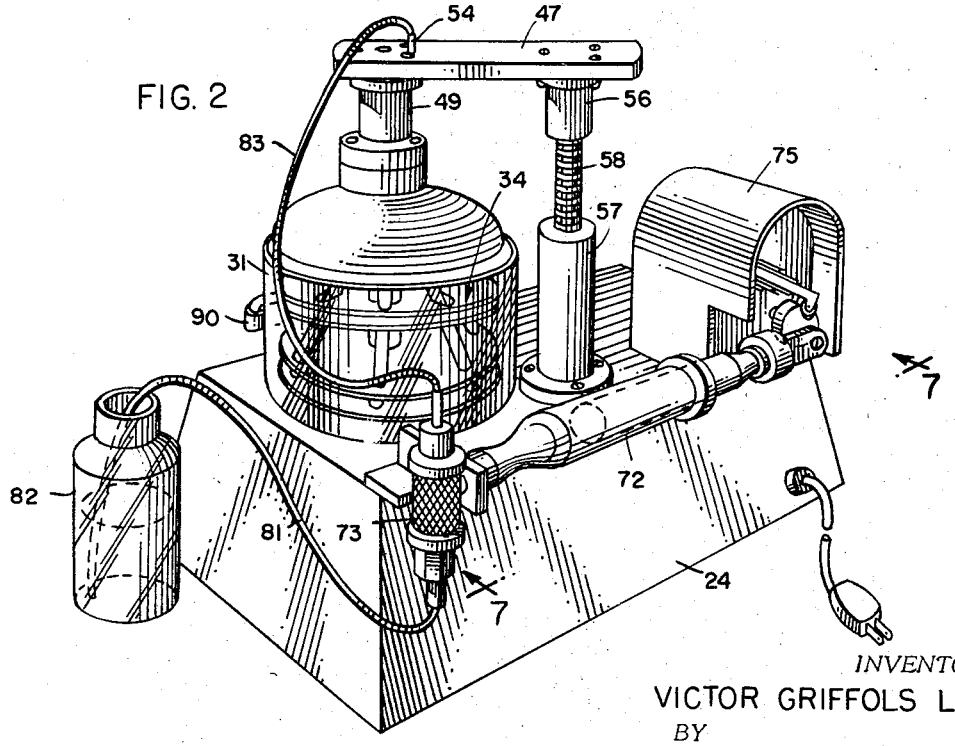
Figure 5:
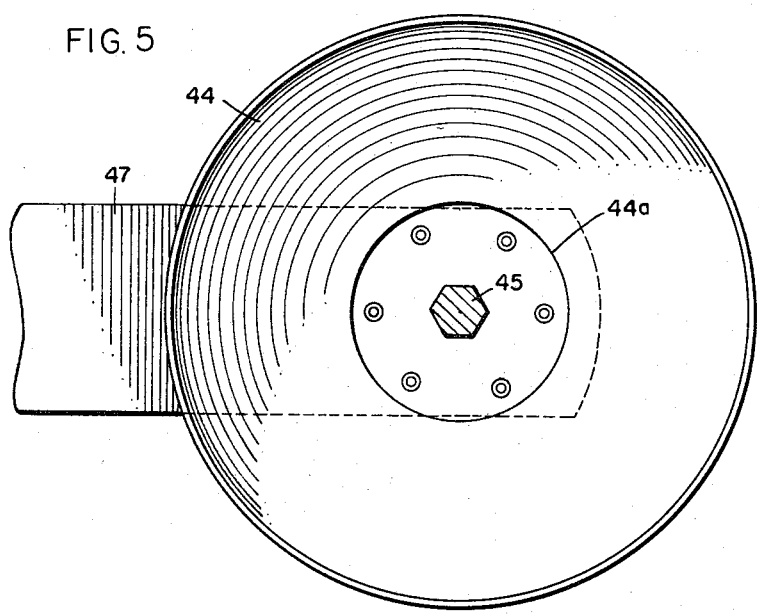
Figure 6:
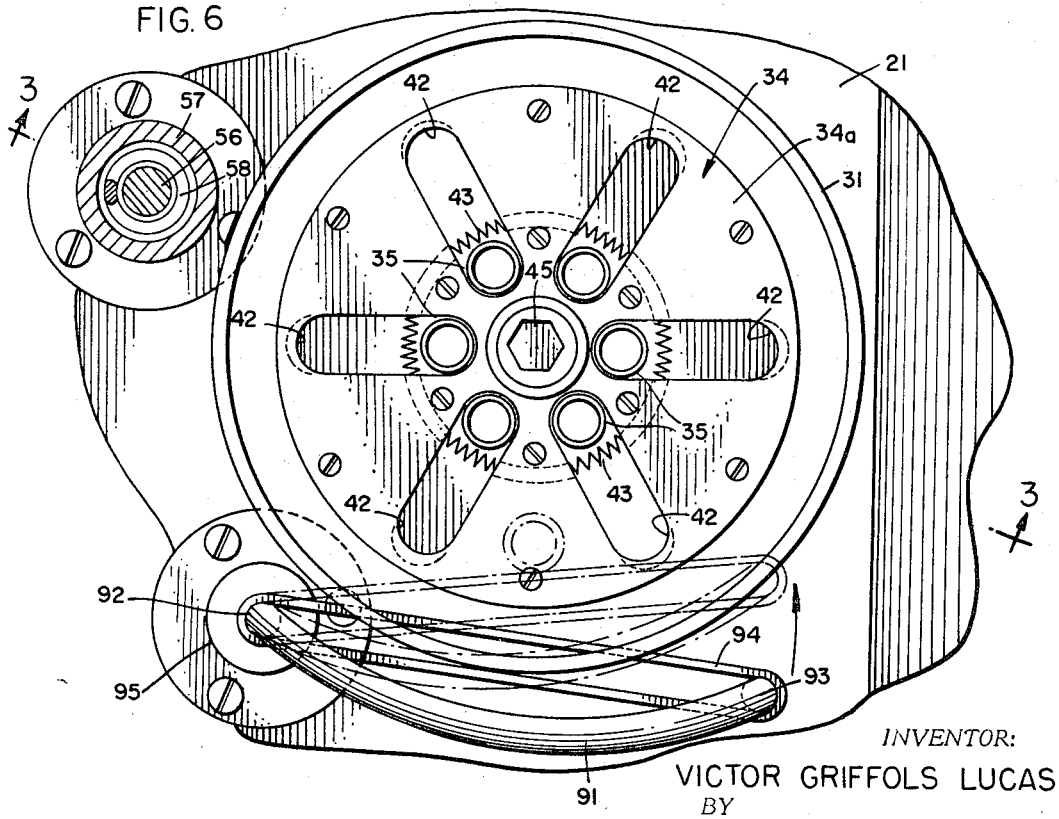
Figure 7:
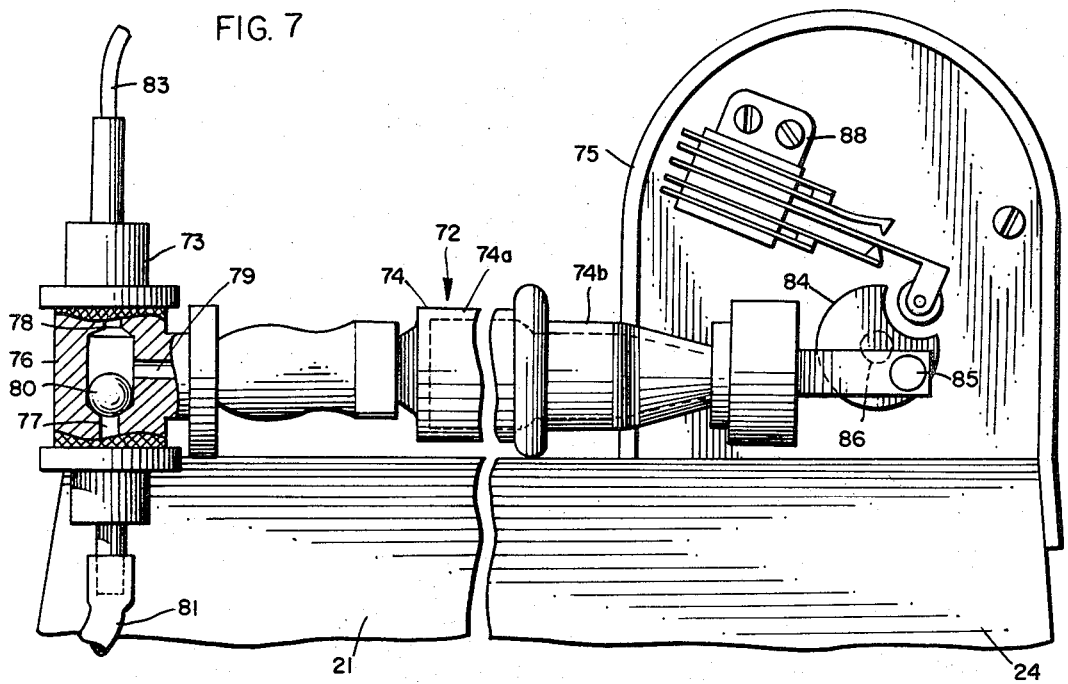
Figure 8:
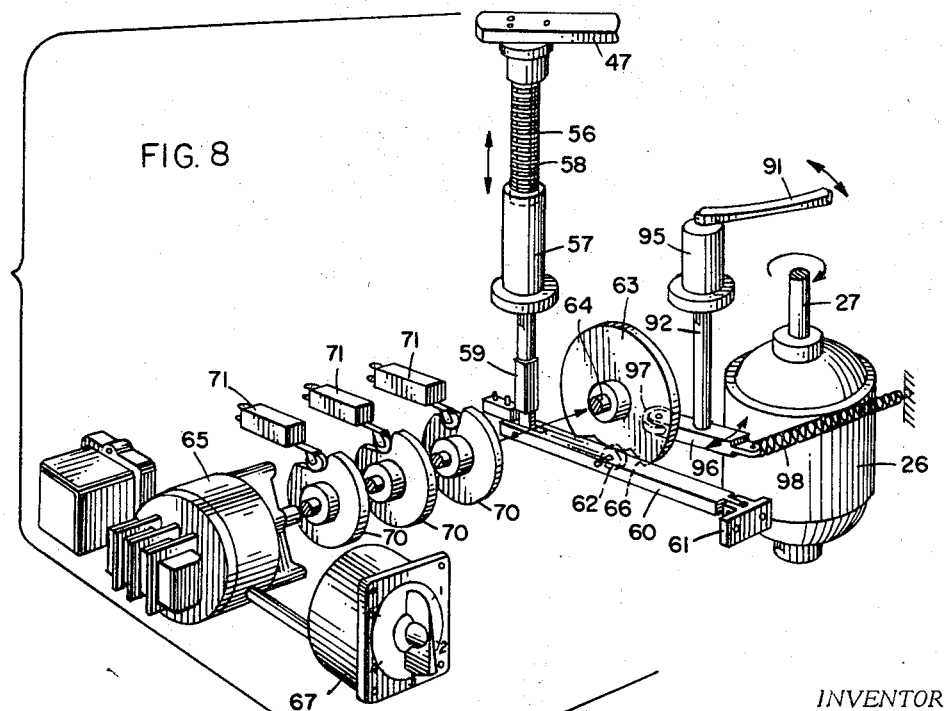

Other objects will appear from the specification and drawings in which:

FIGURE 1 is a perspective view looking towards the front of a centrifuge embodying the present invention;
FIGURE 2 is a perspective view showing the rear portion of the centrifuge;
FIGURE 3 is an enlarged fragmentary vertical sectional view taken along line 3—3 of FIGURE 1;
FIGURE 4 is a horizontal sectional view taken along line 4—4 of FIGURE 3;
FIGURE 5 is a horizontal sectional view looking upwardly along line 5—5 of FIGURE 3;
FIGURE 6 is a hornzinal sectional view looking downwardly from line 6—6 of FIGURE 3;
FIGURE 7 is a rear elevational view shown partly in section and taken along line 7-7 of FIGURE 2;
FIGURE 8 is a perspective view illustrating various operative components of the centrifuge, the wiring for such components being omitted for clarity of illustration;
FIGURE 9 is a fragmentary vertical sectional view of the tube supporting assembly and cover of the centrifuge, the parts being shown at rest with the cover in a fully raised position;
FIGURE 10 is a view similar to FIGURE 9 but showing the parts in the next stage of operation wherein the cover is in a lowered position;
FIGURE 11 illustrates the next stage of operation in which the centrifuge is in rotation and liquid is being introduced into the sample tube;
FIGURE 12 illustrates the centrifuge in operation during a mixing or agitating step;
FIGURE 13 illustrates a next stage of operation during which centrifugation and a separation of the sample's components takes place;
FIGURE 14 illustrates a next step in the operation of the centrifuge wherein decanting occurs;
FIGURE 15 illustrates the final stage of operation during which the parts return to their original condition.

In the embodiment of the invention illustrated in the drawings, the numeral 20 generally designates a centrifuge suitable for laboratory use. The particular unit illustrated in the drawings is adapted for use in a clinical laboratory for carrying out automatically the various procedural steps involved in the Coombs' development test. Since such a test requires the sequential and recycled washing, centrifuging, and decanting of laboratory specimens, the usefulness of the device in automatically performing these steps is an indication of its versatility. It is to be understood, however, that the principles of the invention may also be used in other batch-treatment centrifuges adapted for performing different tests or a different sequence of such operations.

Centrifuge 20 is provided with a base 21 which has top, front, rear, and side walls 22–25 respectively. The hollow base houses, among other things, an electric motor 26 which is secured within the base by any suitable means and which, as shown most clearly in FIGURE 3, has an upstanding drive shaft 27 projecting upwardly through apertures 28 and 29 in the top wall of the base 21 and a mounting plate 30 disposed directly thereabove. An open-topped receptacle or shell 31 is secured to the mounting block directly above motor 26 and the bottom wall of the receptacle has a central aperture 32 in vertical register with openings 28 and 29. A suitable drain passage 33 extends through both the bottom wall of the receptacle and block 30 for the discharge of liquid which might otherwise collect in the lower portion of the receptacle.

Within the receptacle is a supporting assembly 34 for supporting a plurality of test tubes or sample tubes 35. In the illustration given, a total of six tubes are so supported; however, it is to be understood that a greater or smaller number might be provided and, further, that such "tubes" might in fact be larger containers more suitable for applications of an industrial nature. Since the present invention is particularly suitable for laboratory use, however, a relatively small centrifuge preferably adapted to support standard centrifuge tubes is shown herein.

The supporting assembly or member 34 comprises a plurality of horizontally oriented and vertically spaced plates or disks 34a, 34b, 34c, and 34d. All four plates are centrally apertured to receive shaft or spindle 27 and, as shown in FIGURE 3, are held apart by spacer sleeves 36, 37, 38, and 39 which are secured to the spindle, and by nut 40 which is threaded upon the spindle's upper end. Thus, the coaxial disks or plates are fixed to the spindle 27 for rotation therewith.

The lower plate or disk 34d supports the rounded lower ends of sample tubes 35, the tubes extending through a plurality of apertures 41 provided in plate 34c above the lower support plate. Upper plates 34a and 34b are substantially identical and, as shown in FIGURES 3 and 6, are provided with radial slots or openings 42 which are in vertical alignment with the openings 41 in plate 34c. The width of slots 42, and the diameter of openings 41, are sufficiently larger than the outside diameter of sample tubes 35 to permit rotational and pivotal movement of the tubes with respect to the support assembly.

Each tube 35 is supported by the assembly for movement between an upwardly and inwardly inclined position as shown, for example, in FIGURES 3 and 9, and a generally vertical or upstanding position as shown in FIGURE 14. Restraining means in the form of an endless garter spring 43 encircles the circumferential series of sample tubes and assists in holding such tubes in the inwardly tipped or centrifuging position illustrated in FIGURE 3. It will be noted that the spring is disposed between adjacent plates 34a and 34b, such plates thereby serving to hold the spring in place. While the spring tends to urge the upper end portions of the tubes inwardly into contact with the inner limits of slots 42, the force exerted by the spring is insufficient to resist the opposing centrifugal forces exerted upon tubes 35 when the centrifuge is in operation. Therefore, when shaft 27 and tube supporting assembly 34 are rotated at normal centrifuging speeds by motor 26, tubes 35 will pivot outwardly into upstanding positions under the influence of centrifugal force in the absence of a more positive restraining means than spring 43. In swinging outwardly, the tubes pivot at their lower end portions, the pivot point for each tube occurring in the vicinity of plate opening 41 and the smooth rounded bottom end of each tube sliding upon the smooth upper surface of lower plate 34d. It is believed evident that the extent of outward pivotal movement of the sample tubes is limited by the outer extent of slots 42.

The positive-acting means for controlling the position of sample tubes 35 during rotation of the tube support or holder 34 comprises a dome-shaped cover or head 44 disposed above the tube holder and in concentric alignment therewith. As shown most clearly in FIGURE 3, the cover has a concave undersurface; that is, its undersurface slopes or curves outwardly and downwardly. Extending downwardly from the center of the cover is a shaft 45 of noncircular cross section which is slidably receivable within an upwardly opening socket 46 provided by spindle 27. It is believed apparent that when shaft 45 is received within socket 46, cover 44 and tube holder 34 are locked against independent relative rotation. Since both the shaft 45 and socket 46 are of substantial length, considerable vertical movement of the head with respect to the tube holder is possible before disengagement occurs.

The head or cover 44 and its shaft 45 are rotatably suspended from the free end portion of a horizontal arm 47. FIGURE 3 shows that a roller bearing assembly 48 has its inner race secured to the upper end of shaft 45 and its outer race secured within the bore of a depending support collar 49 affixed by screws 50 to the arm's free end. A manifold assembly 51 comprising upper and lower members 51a and 51b is affixed to the intermediate portion of shaft 45 directly above cover 44. The assembly defines a manifold chamber 52 which, as shown in FIGURE 4, has a series of outward extensions 52a.

A large central opening 53 is provided in the top wall of the manifold assembly and a supply tube 54 projects downwardly into the manifold chamber through opening 53 to supply liquid thereto. As seen in FIGURE 3, tube 54 extends upwardly through collar 49 and arm 54.

The bottom of the manifold chamber communicates directly with a plurality of filling tubes 55 which are arranged in a uniformly spaced circumferential series and which project downwardly into the area defined or shrouded by cover 44. It will be observed that the upper ends of the filling tubes communicate with the outer extensions 52a of the manifold chamber, and that the radial distance of such tubes from the axis of shaft 45 is substantially the same as the radial distance of the upper ends of sample tubes 35 from spindle 46 when such sample tubes are in the inwardly sloping positions illustrated in FIGURES 3, 9–13, and 15. Furthermore, the filling tubes 55 and sample tubes 35 correspond in number, are oriented in vertical alignment (when the sample tubes are in their inwardly sloping positions), and are disposed so that when head or cover 44 is lowered, the filling tubes 55 will enter the open upper ends of sample tubes 35. Preferably, the filling tubes are formed of some flexible, stable, and durable plastic material such as, for example, polyvinyl chloride, polyethylene, or polypropylene.

The head-supporting arm 47 is connected at its opposite end to the upper end of a downwardly extending pivot rod or shaft 56, the shaft extending downwardly through a mounting member 57 affixed to the top wall of the base. A spring 58 extends about the shaft between the upper end of mounting member 57 and the shaft's enlarged upper end 56a, and urges the entire cover or head assembly into the raised position illustrated in FIGURE 3. When the cover assembly is so elevated, the hexagonal or noncircular shaft 45 is withdrawn from the socket 46 of spindle 27 and, therefore, the assembly may be pivoted laterally about the axis of pivot shaft 56 to expose the interior of shell 31.

At its lower end, pivot shaft 56 is rotatably received within the upwardly facing socket of a coupling 59 which is in turn connected to one end of an operating lever 60 (FIGURE 8). The lever and coupling are disposed within the hollow base, the lever being mounted for swinging movement in a vertical plane by means of a hinge 61 affixed to the interior of the base's front wall. A small roller 62, carried by lever 60, rides along the undersurface of a camming wheel 63. The wheel is secured to a horizontal shaft 64 slowly rotated by motor 65. As shown in FIGURE 8, wheel 63 has a peripheral cutout 66 and, when roller 62 enters that cutout, lever 60 and the entire cover assembly will be urged upwardly into raised position under the influence of compression spring 58. However, when the wheel has rotated sufficiently so that roller 62 leaves the cutout, lever 60 is cammed downwardly towards the cover 44 into the lowered position illustrated in FIGURES 10–13. Furthermore, when the roller 62 is in a transitional position riding along an edge defining one of the circumferential limits of the cutout 66, the roller as it slowly enters such cutout will permit the gradual elevation of cover 44 under the influence of spring 58 as indicated in FIGURES 14 and 15.

Operation of motor 65 is controlled by a conventional timer 67 which has an operating handle or knob 68 readily accessible for adjustment or setting by a user (FIGURE 1). In the illustration given, the dial 69 on the front wall of the base indicates that the handle may be set so that the unit will perform automatically a total number of five complete cycles of operation, or any number less than that, without resetting.

In addition to cam wheel 63, a series of additional cam wheels 70 are also mounted upon shaft 64 and, as shown in FIGURE 8, such cam wheels are recessed along their peripheries to operate the levers of switches 71. One of the switches 71 is electrically connected to centrifuge motor 26 so that such motor will be automatically energized at the proper time during the operating cycle. Another switch 71 may be used to energize the drive means for the pump assembly 72 shown most clearly in FIGURES 2 and 7.

The pump assembly 72 is mounted upon base 21 and consists essentially of a valve assembly 73, a cylinder and piston arrangement 74, and drive means 75.

The valve assembly 73 includes a valve body 76 having an inlet passage 77, an outlet passage 78, and a passage 79 leading to the chamber of cylinder 74a. A ball check valve member 80 is disposed within the valve body to prevent reverse flow through inlet passage 77. The inlet passage communicates with the passage of flexible tube 81 which leads to any suitable source of liquid such as, for example, bottle 82 (FIGURES 1 and 2). Outlet passage 78 communicates through tube 83 and connected tube 54 with manifold chamber 52. Thus, upon withdrawal or outward movement of piston 74b, such movement being to the right as viewed in FIGURE 7, liquid is drawn from tube 81 and container 82 into valve 73 and cylinder 74a and, upon movement of the piston in the opposite direction, fluid is forced from the cylinder into the valve body and then upwardly through discharge passage 78 into tube 83 leading to manifold assembly 51. The piston 74b is driven by drive wheel or member 84 to which it is eccentrically connected by pin 85, the rotary drive member 84 being affixed to the shaft 86 of electric motor 87 (FIGURE 1).

The synchronization of the pump's operation with that of the centrifuge motor and of the head assembly 44 may be achieved by any suitable mechanical or electrical means as would be well known to one skilled in the art. In the illustration given, operation of the pump is triggered by one of the cam-actuating switches 71 and, once the pump motor has been energized, it will continue its operation for one full pumping cycle (i.e., one intake stroke and one discharge stroke of the piston 74b) after which it will automatically stop. An override switch 88 in circuit with motor 87 is operated by wheel 84 to achieve one-cycle operation of the pump; however, other means for achieving the same result may be used.

Referring to FIGURE 1, the shell 31 which extends about the rotary tube holder 34 is shown to be transparent and to have a horizontally elongated slot or opening 89 along its wall. It is inwardly through this slot that a portion of agitator assembly 90 projects to contact the sample tubes and cause a thorough mixing of their contents as the tube holder rotates.

The agitator assembly comprises an arcuate horizontally extending arm 91 which is mounted at one end upon a vertical spindle 92 and which at its opposite end has a downwardly projecting portion 93 parallel with that spindle, (FIGURES 6 and 8). Resilient friction means in the form of an elastic band 94 composed of rubber or other suitable mterial is carried by the arm, being stretched between spindle 92 and projection 93. The horizontally stretched band is disposed at the same elevation as slot 89 and is narrower (vertically) than the slot. Therefore, as the arm is swung between the retracted position shown in FIGURE 6 into the operative position represented by broken lines, the band or resilient member will be at least tangent to the path of travel of sample tubes 35 and, preferably, will be even closer to the rotary axis of the holder, so that the sample tubes will frictionally engage a substantial portion of the band as they revolve about the axis of the tube holder.

The spindle 92 of the agitator assembly is pivotally supported by a mounting member 95 (FIGURES 1, 6 and 8) which is affixed to the top wall of base 21. As shown in FIGURE 8, the spindle projects downwardly through the member into the interior of the base and at its lower end is provided with a control arm 96. One end of the control arm is provided with a roller 97 which rides upon the end surface of cam wheel 63; the opposite end of the arm is connected to spring 98 which is in turn attached to the base and which exerts a constant force urging the roller into contact with the wheel. Normally, the resilient friction element 94 is maintained in retracted position because the end surface of wheel 63 prevents further inward movement of roller 97. However, when the cam wheel has rotated into a position wherein riding roller 97 may swing into the arcuate recess or cutout 66 of the wheel, then the resilient member 94 will be swung by the action of spring 98 into engagement with the sample tubes carried by holder 34.

Referring to FIGS. 3 and 9–15, it will be seen that the cover 44, is provided with an annular shoulder 44a along its undersurface, the shoulder being disposed intermediate the radial limits of the cover at a point inwardly of the covers downwardly and outwardly curved undersurface. As will be brought out hereinafter, the downwardly extending shoulder 44a defines an annular stop for holding sample tubes in their proper positions despite slight variations in the length of such tubes.

*Operation*

The various steps in the operation of the present invention are illustrated in FIGURES 9 through 15. While operation of the centrifuge will be described in connection with the Coombs' development test, it will be understood that the various operations or steps may also be used in performing other tests and in carrying out different operations.

With the cover in the fully raised position illustrated in FIGS. 3 and 9, an operator may easily swing the cover laterally to expose the interior of shell 31. A plurality of sample tubes 35 each containing a quantity of red cells 100 is positioned within tube support assembly 34 as shown in FIG. 9. Spring 43 may be flexed outwardly to permit the insertion of the lower ends of tubes 35 downwardly through slots or openings 42 and 41.

After a set of tubes 35 is placed within the centrifuge shell 31 as shown, cover 44 is swung into vertical alignment with the tube holder and shaft 45 is partially inserted into socket 46. Operation of the unit is then initiated by turning starter switch 101 (FIG. 1) into an "on" position, timer handle 68 having been previously set to indicate the desired number of operating cycles. Upon energization of the motor 65, cam wheel is slowly rotated to shift cover 44 into the lowered position illustrated in FIGS. 10–13. When the cover is fully lowered, one of the cam-operated switches 71 initiates operation of centrifuge motor 26 and, as indicated by arrow 102 in FIG. 11, the centrifugal force of rotation causes the tubes 35, to pivot outwardly to a slight extent until their upper ends bear against cover shoulder 44a. The shoulder effectively maintains all of the tubes in the inclined position illustrated in FIG. 11, despite slight variations in the length of such tubes, as long as cover 44 is in its lowered position.

After the cover has been lowered and the centrifuge motor 26 is operating at full speed (preferably 1500–

3000 r.p.m.), liquid (isotonic saline) is introduced into the sample tubes 35 through filler tubes 55. Since the head and manifold chamber 52 are rotating at full speed at the time the water is introduced therein, the manifold chamber with its radial extensions 52a effectively meters or proportions the inflowing saline so that each sample tube receives a like amount. The saline, being of lower density or specific gravity than cells 100, forms a separate layer 103 above the cells as the tubes revolve about the axis of centrifugation.

FIGURES 11 and 12 disclose the washing operation, the first step of that operation being the introduction of saline into each sample tube and the second stage being the agitation or mixing of the saline with the particulate matter originally placed within each tube. Mixing is accomplished by movement of the resilient member 94 inwardly through opening 89 in shell 31 as indicated by arrow 104. The resilient member 94 assumes a position in the path of movement of sample tubes 35 and as the tubes swing into frictional contact with the relatively stationary resilient member, the tubes are forced to rotate about their own axis as indicated by arrow 105 (FIG. 12). Thus, the tubes not only revolve about the axis of centrifugation, but also rotate about their own axis, the combined action resulting in thorough mixing of the contents without any interruption whatever in the operation of the unit. It will be observed that thorough mixing is achieved because of the different specific gravities of the mutually immiscible materials contained within the sample tubes, and because such materials tend to be shifted into positions which they would not normally assume in the absence of rotation of the tubes about their own axis.

Following an interval of mixing or agitating of the contents of the tubes, the resilient member 94 is retracted into its original position as indicated by arrow 106 (FIG. 13) and the contents of the tubes are centrifuged for a predetermined period. After centrifugation, the materials within the sample tubes, being of different specific gravity, have stratified as indicated in FIG. 13, the lighter material, in this case water or other washing liquid, being on top of the heavier particulate material 100 which, in the Coombs' tests comprises red blood cells.

Throughout the sequence of steps so far described, the sample tubes have remained in upwardly and inwardly inclined positions, the upper ends of the tubes being restrained against outward movement by internal shoulder 44a of the dome-shaped cover 44. During the final separation step illustrated in FIG. 14, cover 44 raises slowly under the influence of spring 58 as roller 62 rides into recess 66 in cam wheel 63 and the upper ends of the sample tubes are released from engagement with cover shoulder 44a and slide gradually outwardly along the downwardly sloping undersurface of the cover. In swinging outwardly, the tubes pivot within openings 41 of retention plate 34c, the rounded bottom ends of the tubes sliding or rocking upon the upper surface of support plate 34d. Gradual radial pivoting of the tubes is assured because the cover 44 raises slowly and because the undersurface of the cover slopes downwardly at sharper angles than the path of movement defined by the upper end of each pivoting sample tube. Finally, when the cover approaches its fully raised position, outward pivoting movement of the tubes is discontinued because the upper portions of the tubes reach the outer limits of the slots 42 defined by guide plates 34a and 34b.

During separation or decanting of the content of the tubes, each of the assembled tubes 35 is in a substantially upright position. Since the centrifuge motor is still in full speed operation, the denser component (solid) 100 is forced radially against the outermost portion of the cylindrical interior wall of each tube and the lighter component (liquid) 103 is also forced outwardly, competing unsuccessfully with the denser material in assuming the most outward position within each sample tube. To the extent that centrifugal force exceeds gravitational force, the contents will tend to flow upwardly out of the upper ends of the tubes (FIG. 14). Depending on the materials to be separated, their physical state (solid-liquid), their densities, viscosities, surface tensions and particle sizes, and depending on the rate of rotation, speed of pivoting, and ultimate position of the tubes, it has been found practical to achieve a clean separation between the materials in the sample tubes, the lighter materials being discharged from the upper ends of the tubes and flowing outwardly from the unit through drain 33, and the heavier materials being retained within the tubes.

Following the separation and decanting steps, the centrifuge motor is de-energized and the sample tube support decreases in rotational speed until the force of spring 43 exceeds the centrifugal force imposed on the tubes. Thus, as the centrifuge slows to a halt, spring 43 pivots tubes 35 back into the upwardly and inwardly inclined positions indicated in FIG. 15.

In the Coombs' test, three washings of the red cells with physiologic saline are required. Timer 67 automatically recycles motor 65 and the entire operation described above is repeated until a total of three washings have occurred. Thereafter, the technician raises cover 44 and swings it away from the shell 31 to expose the open-topped sample tubes 35. Coombs' serum is pipetted into each of the sample tubes, cover 44 is replaced, and, by depressing button 107, the mixing and centrifuging steps (FIGS. 12 and 13) are repeated without the washing and decanting steps, operation of the pump motor 87 being electrically cutout by one of the switches 71 actuated by button 107.

While in the foregoing I have disclosed an embodiment of the invention in considerable detail for purposes of illustration, it will be understood by those in the art that many of these details may be varied without departing from the spirit and the scope of the invention.

I claim:

1. In a centrifuge, a frame, a sample tube holder mounted upon said frame for rotation about a vertical axis, a plurality of open-topped vertically elongated sample tubes supported by said holder adjacent their lower ends, said tubes being spaced uniformly radially outwardly from said vertical axis and being supported by said holder for outward and inward pivotal movement of the upper ends thereof, said tubes normally extending upwardly and inwardly towards said vertical axis and being swingable outwardly into generally vertical positions under the influence of centrifugal force when said holder is rotated, and a cover disposed above said holder and engageable with the upper ends of said tubes, means locking said cover and holder against independent relative rotation without restraining axial movement of said cover with respect to said holder, said cover providing an undersurface engaging the upper ends of said tubes for guiding outward pivotal movement of said tubes as said cover and holder are moved axially apart during simultaneous rotation thereof.

2. The structure of claim 1 in which means are provided by said centrifuge for preventing outward pivoting of said tubes beyond substantially upstanding positions.

3. The structure of claim 1 in which the undersurface of said cover slopes outwardly and downwardly.

4. The structure of claim 1 in which the undersurface of said cover curves downwardly and outwardly.

5. The structure of claim 1 in which the undersurface of said cover has an annular shoulder preventing outward pivoting of the upper ends of said tubes despite slight variations in the lengths thereof until said cover and holder are axially separated a predetermined distance.

6. The structure of claim 1 in which said holder includes a vertical spindle and a lower tube support plate secured to said spindle, said plate providing a substantially horizontal upper surface and said sample tubes having rounded lower ends resting upon said surface.

7. The structure of claim 6 in which said holder also includes a tube retention plate spaced slightly above said tube support plate and having a series of circumferentially spaced apertures through which the lower portions of said sample tubes rotatably extend.

8. The structure of claim 7 in which said holder also includes at least one upper guide plate secured to said spindle and having a circumferential series of radially elongated apertures rotatably receiving the upper end portions of said sample tubes, the radial limits of said elongated apertures limiting the extent of radial pivotal movement of said sample tubes.

9. The structure of claim 1 in which means are provided for normally urging said sample tubes into inwardly sloping positions, said last-mentioned means comprising a spring carried by said holder and engaging the outer surfaces of said tubes.

10. The structure of claim 1 in which an outer shell is mounted upon said frame and extends about said holder, said shell redirecting the flow of liquid discharged from said sample tubes when the same are rotated in their upstanding positions.

11. The structure of claim 1 in which means are provided for selectively shifting said cover axially with respect to said holder for permitting outward pivotal movement of said tubes under the influence of centrifugal force as said cover is moved axially away from said holder.

12. In a centrifuge having a rotatable holder for suporting and rotating a plurality of open-topped sample tubes and for supporting said tubes for limited radial pivotal movement about the lower ends thereof between inwardly and upwardly sloping first positions and generally vertical second positions, the combination comprising: a cover having an undersurface adapted to engage the upper ends of said sample tubes, said cover being movable vertically and axially with respect to said holder to control the extent of outward pivotal movement of said tubes under the influence of centrifugal force, and power means for vertically moving said cover.

13. The structure of claim 12 in which said undersurface of said cover slopes downwardly and outwardly.

14. The structure of claim 12 in which said undersurface of said cover is radially curved downwardly and outwardly.

15. The structure of claim 12 in which means are provided for urging said tubes into said inwardly and upwardly sloping first positions when said rotatable holder is stationary.

16. A method of separating the contents of a sample tube comprising the steps of: supporting an open-top tube containing mutually immiscible materials of different densities for revolution about a vertical axis of centrifugation, and for radial pivotal movement between one position in which the tube slopes inwardly towards the axis of centrifugation and another position wherein the tube is substantially parallel to the axis of centrifugation; revolving said tube about said axis of centrifugation while maintaining said tube in said one position; and then pivoting said tube into said other position while continuing to revolve the same about said axis of centrifugation to discharge a portion of the contents of said tube from the open upper end thereof.

17. A method of separating the contents of a sample tube comprising the steps of: supporting an open-topped tube containing mutually immiscible materials of different densities for revolution about a vertical axis of centrifugation and for radial pivotal movement between one position in which the tube slopes inwardly towards the axis of centrifugation and another position wherein the tube is pivoted outwardly into generally vertical position under the influence of centrifugal force; revolving said tube about said axis of centrifugation while said tube is in said one position and simultaneously engaging the upper end of said tube to prevent pivotal movement of the same into said other position, whereby, the contents of said tube are retained therein under the influence of centrifugal force; and thereafter gradually releasing the restraining force applied to the upper end of said tube while said tube revolves about said axis of centrifugation to permit gradual outward pivotal movement of said tube into said second position under the influence of centrifugal force, thereby causing a portion of the contents of said tube to be discharged from the open upper end thereof.

References Cited

UNITED STATES PATENTS

| | | | |
|---|---|---|---|
| 650,529 | 5/1900 | Eggeman | 223—26 |
| 998,529 | 7/1911 | Ketcham | 233—17 |
| 2,739,759 | 3/1956 | Davidson et al. | 233—26 |
| 2,834,541 | 5/1958 | Szent-Gyorgyi et al. | 233—26 |
| 3,235,173 | 2/1966 | Unger | 233—17 |

FOREIGN PATENTS

| | | |
|---|---|---|
| 864,410 | 4/1961 | Great Britain. |
| 102,783 | 10/1941 | Sweden. |

HENRY T. KLINKSIEK, *Primary Examiner.*